United States Patent [19]

Goodman et al.

[11] Patent Number: 5,479,395
[45] Date of Patent: Dec. 26, 1995

[54] SERIAL BUS SYSTEM

[75] Inventors: David M. Goodman, St. Albans; Carlo Capaldo, Potters Bar, both of United Kingdom

[73] Assignee: Northern Telecom Limited, Montreal, Canada

[21] Appl. No.: 243,501

[22] Filed: May 16, 1994

[30] Foreign Application Priority Data

May 21, 1993 [GB] United Kingdom ............... 9310539

[51] Int. Cl.⁶ ............................................. H04L 12/407
[52] U.S. Cl. ..................... 370/16; 370/85.2; 370/85.11; 370/85.6; 340/825.5
[58] Field of Search ...................... 370/16, 85.9, 85.11, 370/85.2, 85.3, 85.4, 85.5, 85.6, 85.7; 371/8.2, 11.2; 340/825.03, 825.5, 825.51

[56] References Cited

U.S. PATENT DOCUMENTS 4,628,311  12/1986  Milling ........................ 370/85.2 X
4,656,627  4/1987  Hasley et al. ..................... 370/85.9
4,998,244  3/1991  Lee et al. ....................... 370/85.11 X
5,329,521  7/1994  Walsh et al. ........................ 370/16

FOREIGN PATENT DOCUMENTS 2015217  9/1979  United Kingdom .............. H04L 5/22

Primary Examiner—Douglas W. Olms
Assistant Examiner—Russell W. Blum
Attorney, Agent, or Firm—Lee, Mann, Smith, McWilliams, Sweeney & Ohlson

[57] ABSTRACT

A multi-master serial bus system supporting, for example, up to 32 masters, and usable in applications requiring high-speed communications within a shelf. A plurality of nodes (2, 3, 4, 5) are interconnected by a highway (1) over which data is transmitted between the nodes. Each node has access control means (6) which ensures only one node accesses the highway at a time by means of an arbitration scheme. Data transmission involves an arbitration phase and a transmission phase and the highway comprises three lines, two of which are shared and perform respective functions in the arbitration and transmission phases (FIG. 1).

6 Claims, 18 Drawing Sheets

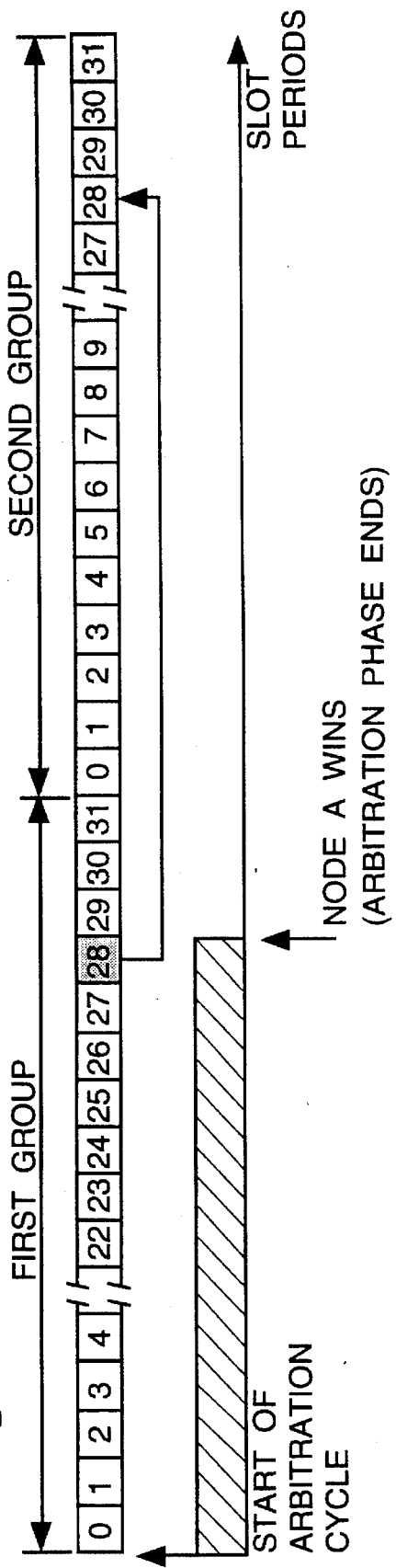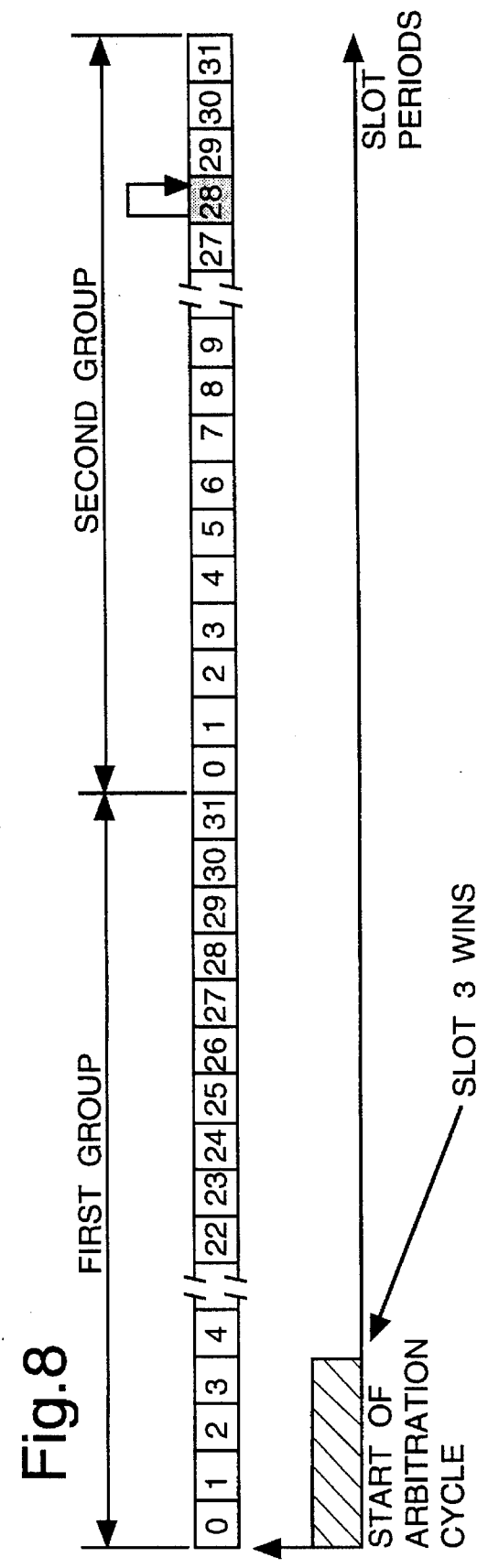

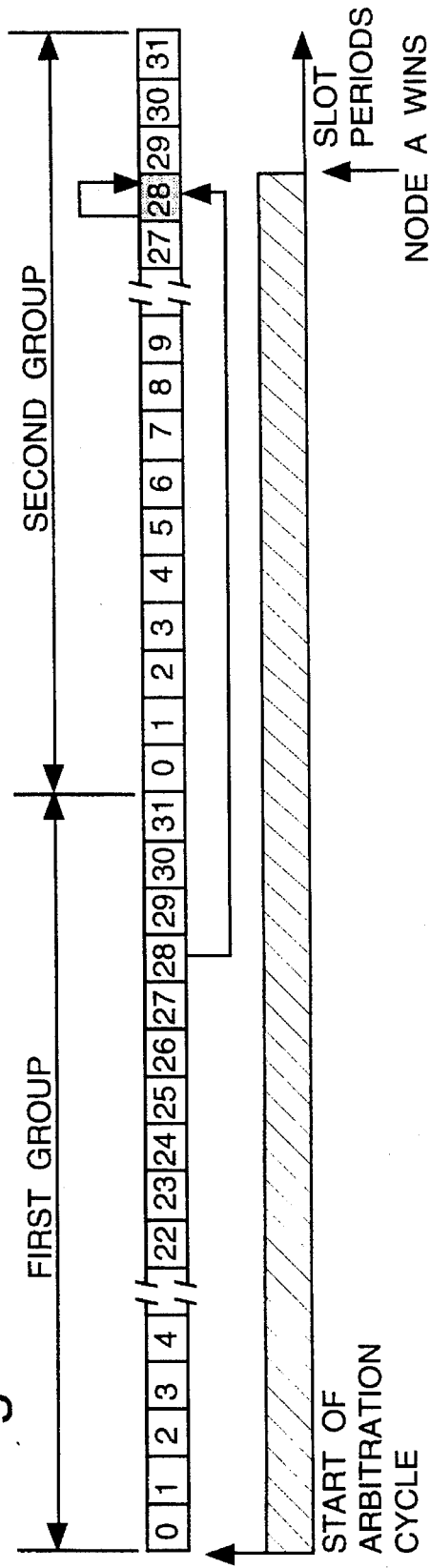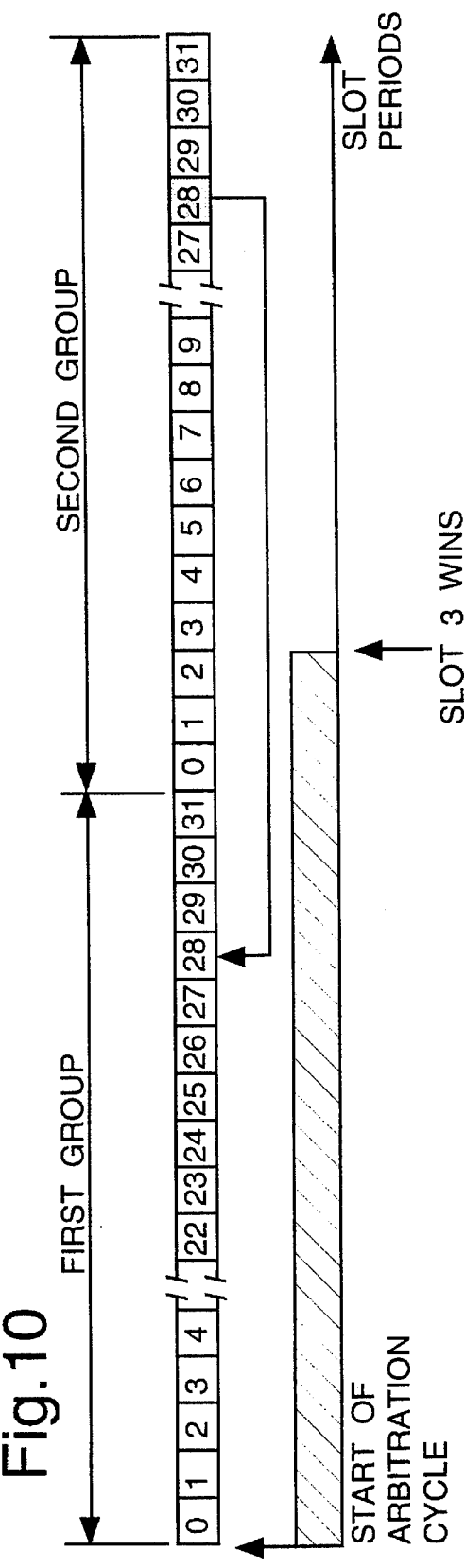

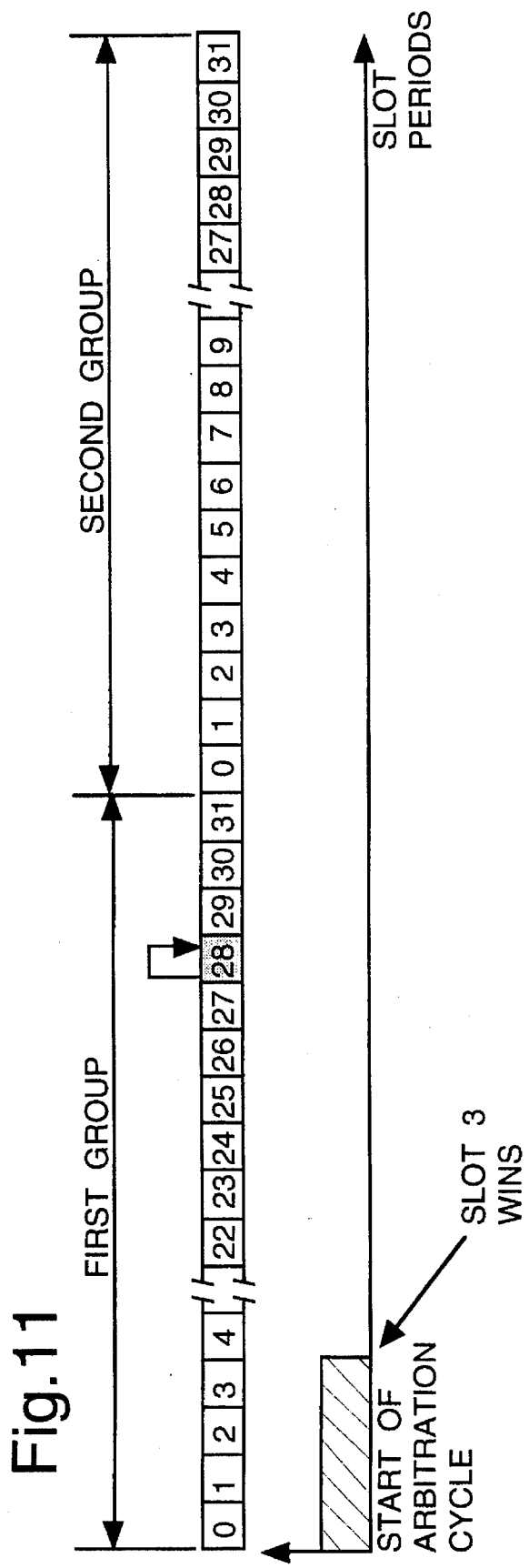

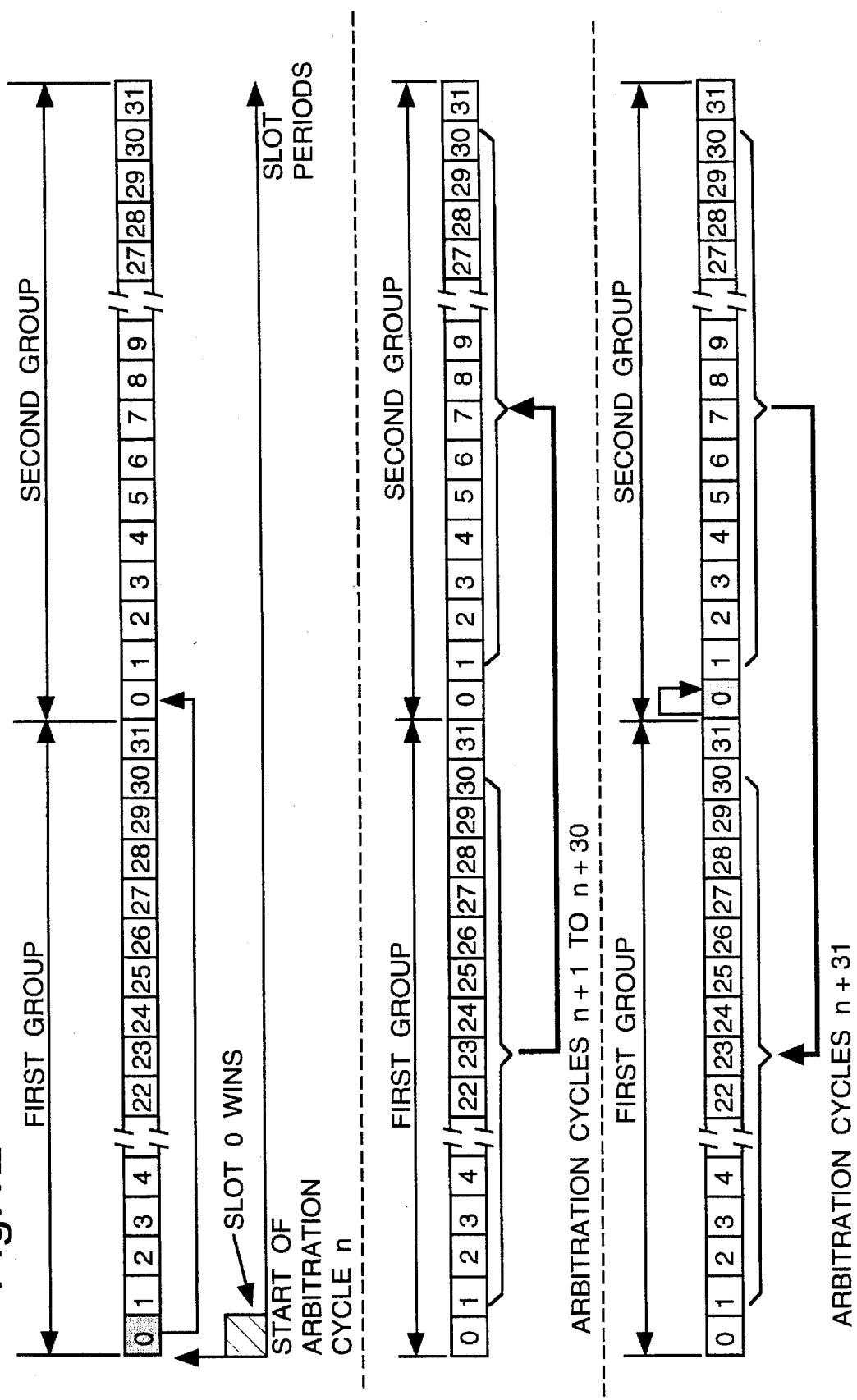

BUS ACCESS CONTROL

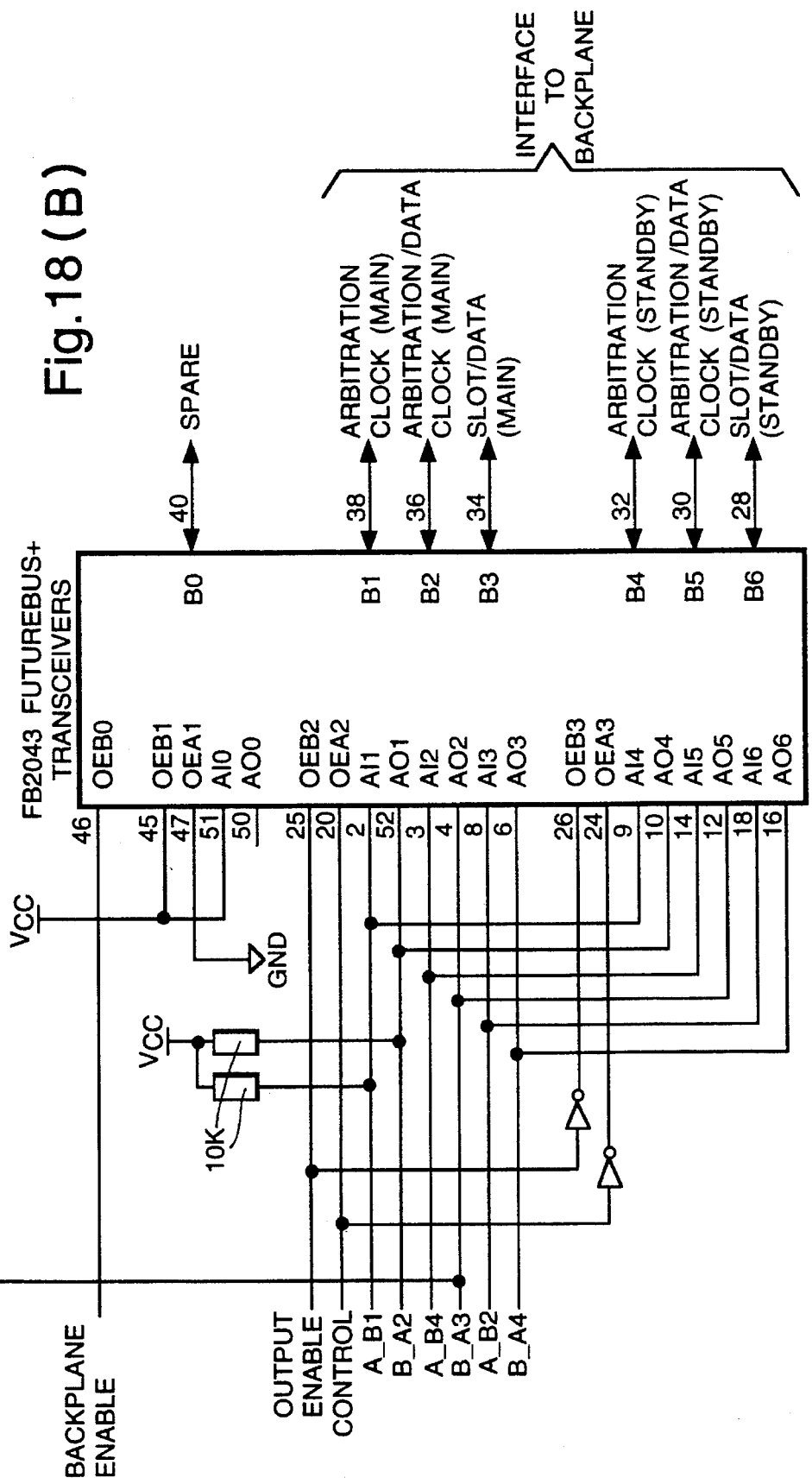

5,479,395

SERIAL BUS SYSTEM

This invention relates to a serial bus system and in particular to a multi-master serial bus (MMSB) system for applications requiring high-speed communications within a shelf.

In a previously proposed MMSB system, two wires (clock and data) were used and the bus access mechanism consisted of a "back-off and retry" scheme. A card wishing to transmit on a bus carrying heavy traffic would abort its attempts at transmission and wait a predetermined period before attempting to gain access to the bus a second time. Some nodes were thus forced to wait an unacceptably long time before establishing communication. Furthermore the communications controllers employed were only capable of supporting relatively slow transfer rates. In addition there was a simple interface, between the communications controller and the microprocessor based on each card, which was typically constituted by a FIFO arrangement requiring frequent servicing by the processor.

A further system is described in specification No. GB-A-2015217. In this system, multiple stations competing for a serially reusable resource are provided with a distributed priority resolution mechanism to overcome time delay incurred by centralised resolution mechanisms. This system performs data transfer in fixed cycle time segments and arbitrates for the next access during data transfer in such a segment. The clock is distributed to control both the data transfer segment and arbitration.

The object of the present invention is to provide an improved serial bus system.

According to the present invention there is provided a multi-master serial bus system comprising a plurality of nodes, a communications highway over which transmission of data between the nodes can be effected, and access control means enabling only one node to access the highway at a time, wherein the transmission of data from one node to another comprises an arbitration phase and a transmission phase, and wherein the highway comprises three lines, two of which are shared and perform respective functions in the arbitration and transmission phases.

The system effects transfer of data and clock with a rate and duration suited to the transmitter and receiver. Access is resolved after transfer has taken place. Transfer of clock and data between receiver and transmitter is permitted while using the same "wires" to resolve arbitration with a central clock.

Embodiments of the invention will now be described with reference to the accompanying drawings, in which FIG. 1 illustrates a basic multi-master serial bus system;

FIG. 7 illustrates the "never won before" case;

FIG. 8 illustrates the "lose first set" case;

FIG. 9 illustrates the "win second set" case;

FIG. 10 illustrates the "lose second set" case;

FIG. 11 illustrates the "someone else wins" case;

FIG. 12 illustrates the worst case scenario;

Figure 1:
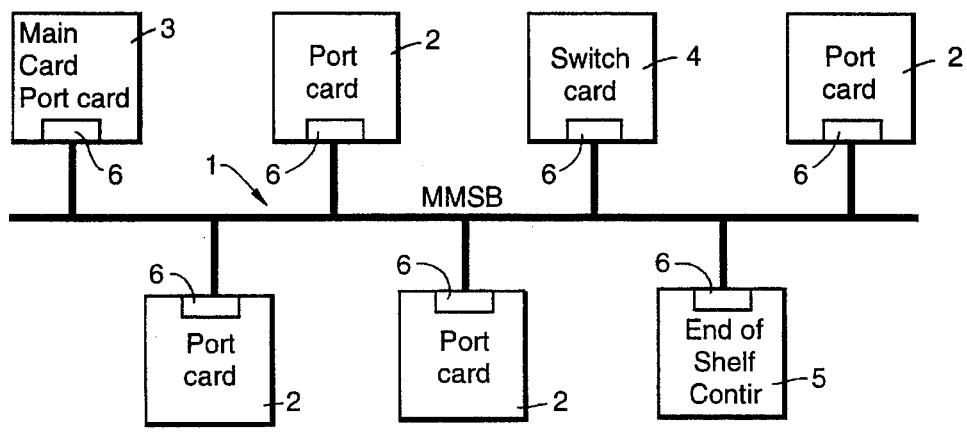

In FIG. 1 there is illustrated a multi-master serial bus (MMSB) system including a MMSB 1 (communications highway) interconnecting a number of cards within a shelf of, for example a telecommunications equipment, for communication between the cards. Various types of cards are possible. In the illustrated arrangement there are four line (port) cards 2, operating at a first rate, a main line card 3, operating at a second rate, a switch card 4 that maps from one rate to the other, and an end of shelf controller (EOSC) 5. Cards normally communicate by sending HDLC (high-level data link control) type messages along the bus 1. In the MMSB arrangement of the present invention, any card may initiate a transfer of data to any other card, furthermore broadcast messages are supported. In order to achieve this each card has a respective sub-section 6, including a communications controller, which will be described in greater detail hereinafter. The type of data normally sent over the MMSB 1 varies with the application but typically the MMSB 1 is used for card configuration and control by the EOSC 5: alarm and fault reporting back to the EOSC 5; card to card communication for protection switching, and routing of port to port network management communications.

Figure 2:
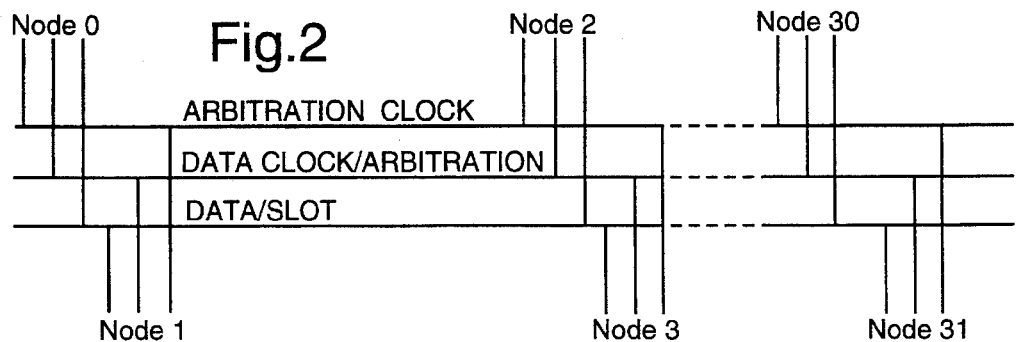
FIG. 2 illustrates a three wire (line) backplane system.

As mentioned above, in the previously proposed MMSB system two wires, clock and data, were used. The presently proposed protocol uses three wires (lines) in order to achieve superior performance. FIG. 2 illustrates this schematically for a 32 node arrangement, the nodes being the cards and EOSC referred to above. The three wires are duplicated for protection (not shown in FIG. 2). One wire is for an arbitration clock, whereas the other two wires are shared and perform a dual function (data clock/arbitration and data/slot). Preferably all of the back plane signal levels conform to the IEEE Futurebus+Standard. The shared wires perform one function in a first part of the total transmission cycle and a second function in a second part of the total transmission cycle. Transmission thus consists of two distinct phases which are sequential. There are termed the arbitration phase (first part of transmission cycle) and the transmission phase (second part of transmission cycle). By the re-use of the "shared" wires efficient use is made of the backplane signals.

The arbitration clock is a clock which is sourced from a central point (plug-in unit/card) within the shelf. Since the arbitration clock is duplicated for protection purposes, the standby clock is sourced from a different card within the shelf. If, for example, there are two switch cards, one may source the main clock whereas the other sources the standby clock. As will be apparent from the following, the arbitration clock is used by all nodes wishing to transmit and it is active only during the arbitration phase. Typically the arbitration clock rate may be 7 MHz.

The data clock/arbitration wire carries an arbitration signal during the arbitration phase and is used to indicate that this part of the overall transmission cycle is taking place. Once the arbitration phase has been completed, the signal becomes the data clock for the transmission of data. The data clock maximum frequency is limited by the maximum speed of operation of the communications controller, typically this may be 16 MHz.

The data/slot wire is the slot signal during the arbitration phase when it is used to identify the point at which one of the nodes wishing to transmit has "won" control of the bus. This is described in greater detail hereinafter. Once the arbitration phase has been completed this signal becomes the actual data to be transmitted. Assuming a data clock rate of 16 MHz, the maximum data transfer rate is 16 Mbits/sec.

Figure 3:
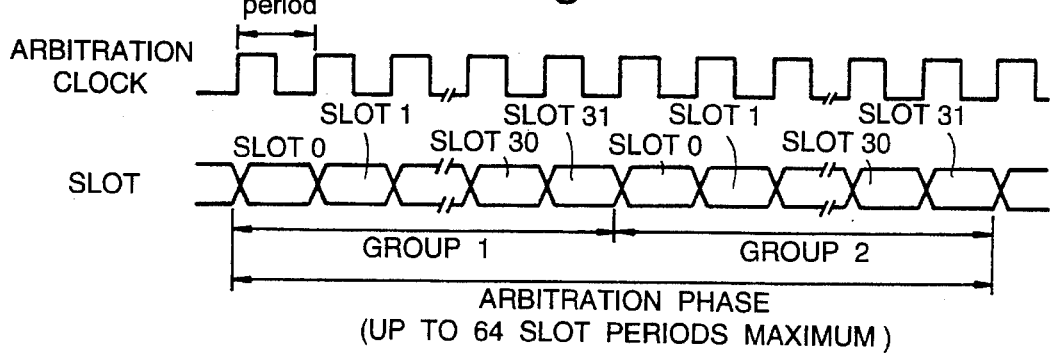
FIG. 3 illustrates the division of the arbitration phase into groups and slot periods.

The three signals taking part in the arbitration phase are thus the arbitration clock, arbitration and slot signals. The arbitration phase is divided up into a maximum of 64 slots (FIG. 3), where each slot corresponds to a positive edge of the arbitration clock. These slots are divided into two groups of 32 slots in order to support up to 32 nodes (masters/cards) on a bus. The use of two groups is related to the "fairness" access scheme described in greater detail hereinafter. Each node has a unique slot number associated with its card and this number is derived from its physical position in the shelf. Typically the slot number will be a "hardwired" arrangement.

Figure 4:
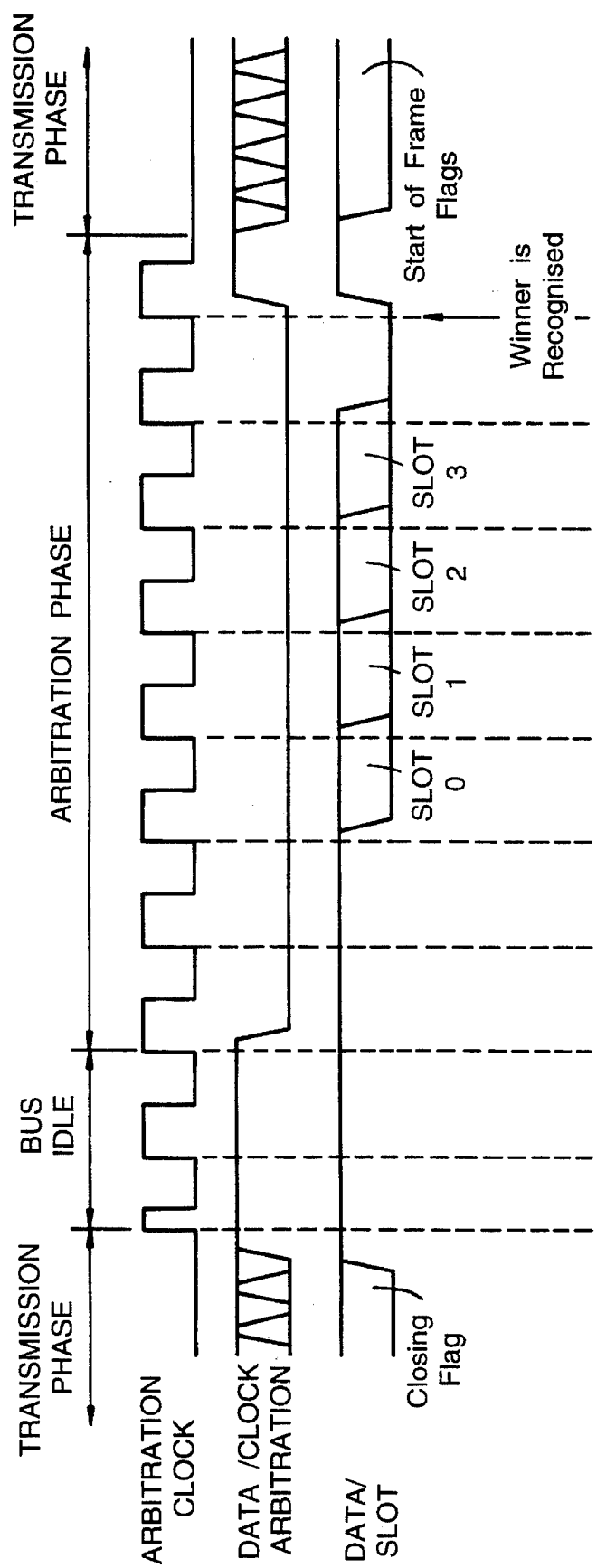
FIG. 4 illustrates the timing operation of the total transmission cycle.
Figure 5:
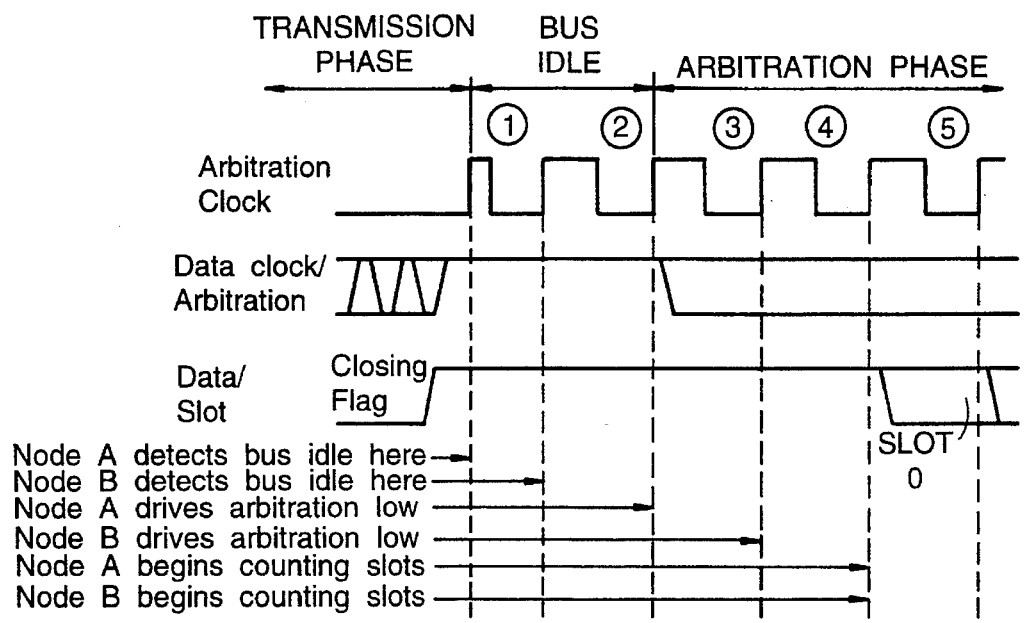
FIG. 5 illustrates synchronising the state of the arbitration phase.

Referring now to FIG. 4, the sequence of events during a complete transmission cycle will now be described. There is a bus idle condition which is defined to be the state: arbitration=slot="logic 1" for two rising edges of the arbitration clock. Any node requiring to send data may begin an arbitration cycle by pulling the arbitration signal low on the following clock cycle. The first time a node needs to transmit data, the node counts slot numbers from the beginning of the arbitration, counting the third clock cycle as slot 0. When the count reaches the physical back plane slot number of the node, the slot line is driven low. The node "wins" the arbitration if in the slot period prior to its slot position a "1" was present in the slot line. The node "loses" the arbitration if there is present a "0" on the slot line at any time during the arbitration phase before its slot position. In this case the arbitration phase terminates since another node will have won. A "node has won" condition is defined to be the state arbitration =slot="logic 0" on the rising edge of the arbitration clock. At this point, every node except the "winner" stops driving the arbitration and slot lines and becomes a receiver. The winner "grounds" the arbitration clock and then switches (enables) the function of the arbitration and slot signals to become data clock and data respectively. At this point the transmission cycle enters the transmission phase. At the end of the transmission phase the winning node releases (stops grounding) the arbitration clock to allow a new arbitration phase to begin. This may result in the first period of the arbitration clock being incomplete as illustrated in FIG. 4. Depending on the duration of this initial pulse and the relative positions of nodes within a shelf, some nodes wishing to transmit may detect this transition whilst others may not. The start of the arbitration phase is therefore delayed for a further period of the arbitration clock to ensure that all nodes wishing to transmit will have detected the bus idle state. If there are two nodes wishing to transmit and node A detects the bus idle state on the first edge of the arbitration clock, whereas node B detects the bus idle state on the following edge (see FIG. 5), according to the nodes referred to above, node A will pull the arbitration signal low on the following [third] clock cycle and will begin counting slot numbers two clock cycles later. On the fourth cycle, node B will pull the arbitration signal low, but since node A has already pulled it low i.e. someone else has started the arbitration phase, node B begins counting slot numbers from the following (fifth) arbitration clock period. Hence the counting of slot numbers for nodes A and B is therefore synchronised to the first node to pull the arbitration signal low.

The signals taking part in the transmission phase are data clock and data signals. Transmission takes place in accordance with HDLC framing rules, hence transmission begins and ends with a sequence of flags. Typically an HDLC frame comprises a start series of 8-bit frame flags, an 8/16 bit address, an 8/16 bit control word, 8×n bits of information to be transmitted, a 16/32 frame check sequence and an 8-bit closing flag. It should be noted that once a node has won control of the serial bus, it originates both the data and clock. Therefore as long as a receiving node can accommodate the small timing skews between the two signals, resulting from a maximum length point-to-point backplane connection, the transmission rate during the transmission phase is only limited by the maximum rate at which the communications controller can operate. The speed of transmission is thus independent of the bus length.

Figure 6:
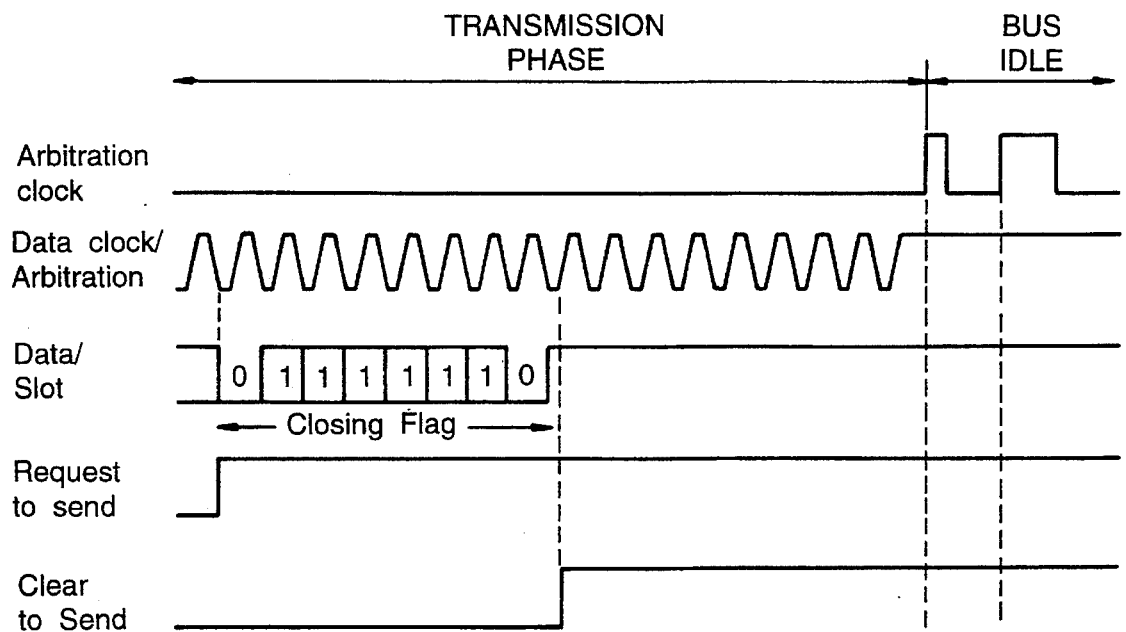
FIG. 6 illustrates changeover between the transmission and arbitration phase.

Since two of the signals featured in the proposed MMSB system protocol operate dual functions, it is imperative that data integrity is maintained in the changeover period between the transmission phase and the arbitration phase. A "clean" transition is achieved with the sequence of events illustrated in FIG. 6. The end of a transmission is detected by the removal of a request to send signal from the communications controller. After a further eight data clock cycles, during which the closing flag is transmitted, the clear to send signal is de-activated by the communications controller. Finally, after a further eight clock cycles, the driver which grounds the arbitration clock is switched off, thereby enabling the arbitration clock (on the back plane) and allowing a new arbitration phase to follow.

In order to ensure equal access to all nodes wishing to transmit, a "fairness" scheme based on the slot positions of each node is employed. If a node wins the arbitration phase, it adds 32 to its slot position, so that in the next arbitration phase the node will have the same relative slot position but in the second group of 32 slots (see FIG. 3). This may be considered as analogous to having a league table with two divisions. A node always keeps its relative position within a division, but if it wins an arbitration phase it is subsequently relegated to the same position in the second division. This rule still applies if a node wins from the second group of slots, i.e. if a node wins the arbitration phase in the second division it will remain in the second division. If, however, a node begins an arbitration phase in the second group and the first 32 slot periods of an arbitration phase pass without a winner, then at the end of the first 32 slot periods, the node subtracts 32 from its slot position and returns to the first group.

There now follows a discussion in greater detail of the "fairness" scheme with reference to a number of typical arbitration scenarios, which clarify the operation of the fairness scheme. In all cases it is assumed that an arbitrary node, called "node A' is wishing to transmit and its physical slot position in the back plane is equal to "28".

As indicated in FIG. 7, node A is in slot 28 in the first group of slots initially. In this case node A initiates an arbitration phase in the first group. No other nodes wish to transmit and node A wins the arbitration when its slot position is reached (slot 28). Node A therefore has 32 added to its slot position and moves into the second group for the next arbitration phase.

Referring now to FIG. 8 in the next arbitration cycle, node A is positioned initially in the second group. Another node, e.g. the node in slot position 3, also wishes to transmit. Since "slot 3" begins in the first group it wins when its slot position is reached. However, node A remains in group 2. This is because it would be "unfair" to nodes of higher priority still waiting to transmit in group 1, if node A is allowed back into the first group after having lost an arbitration phase for the first time.

In the case illustrated in FIG. 9, once again node A begins an arbitration phase in the second group, but no other node in the first or second group wishes to transmit. Therefore node A wins the arbitration and remains in the second group.

In the case illustrated in FIG. 10, node A also begins an arbitration phase in the second group. No other node wishes to transmit in the first group. However, the node in slot position 3 had already won a previous arbitration cycle and also begins this arbitration phase in the second group. Both nodes wish to transmit and slot 3 "wins" when its slot position is reached. According to the fairness rules, node A is now allowed back into the first group for the next arbitration cycle, since it had lost the second set.

In the case illustrated in FIG. 11, node A begins in the first group. The node in slot position 3 also wishes to transmit and wins when its slot position is reached. Node A is therefore allowed to remain in the first group for the next arbitration cycle, in this "someone else wins" case.

FIG. 12 illustrates the worst case scenario from the point of view of a node wishing to access the bus. Consider the case where all nodes begin an arbitration cycle in the first group except the node in slot position 31, which begins in the second group. All of the nodes except slot 31 wish to transmit. The node in slot position 0 wins, transmits, and is moved to the second group. As this is taking place the node in slot position 31 wishes to transmit. In the arbitration cycles that follow (cycles n+1 to n+30), the nodes in slot positions 1–30 are moved to the second group in succession. Slot 31 (currently in the second group) still wishes to transmit. In the next arbitration cycle (n+31), assume that the nodes in slot positions 0–30 wish to transmit again, with a request to transmit still pending from node 31. In the case all nodes begin an arbitration cycle in the second group and all of the nodes wish to transmit. The node in slot position 0 wins, transmits and remains in the second group. All of the remaining nodes (including node 31) are promoted to the first group. The node in slot position 31 will therefore have to wait until nodes 1–30 have transmitted a second time and moved to the second group before slot 31 is finally allowed to transmit. The probability of this occurring, however, is very small.

Figure 13:
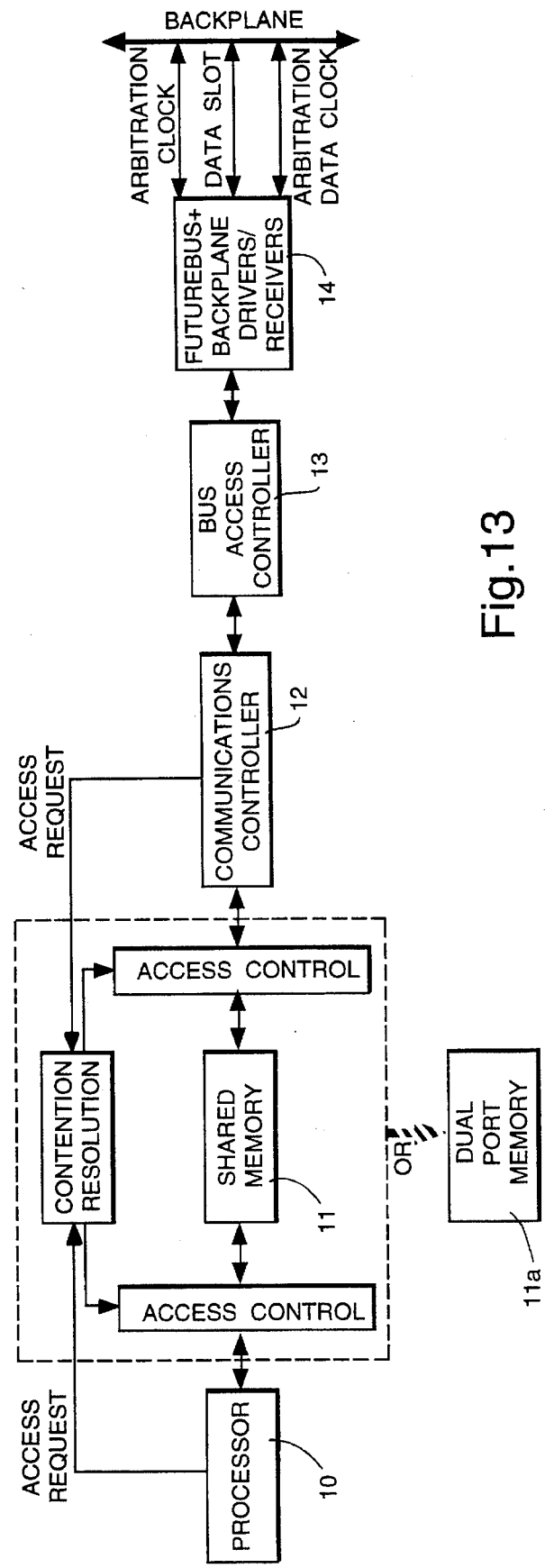
FIG. 13 illustrates a top level block diagram of the MMSB.

The MMSB system proposed by the present invention can be implemented using readily available components, although clearly one or more ASICs (Application specific integrated circuit) could be designed if required. A top level block diagram of the highway access control means of the MMSB system is illustrated in FIG. 13. The circuitry is repeated on all of the nodes/line cards etc. of a shelf which require to take part in the information transmission. It is not necessary that all cards on a shelf take part, rather just a chosen subset can take part. The processor 10 is not simply part of the MMSB system rather it is a processing resource of that card/node. It need not necessarily be the main on-board processor, rather it could be, for example, a co-processor. The memory 11 is shared between the processor 10 and the communications controller 12.

Messages to be transmitted onto the back plane are stored in an area of shared memory 11 or Dual-Port RAM (DPRAM) by the processing resource 10. A shared memory area is required in the case of a communications controller such as the SGS-Thomson MK50H21 Serial Communications Controller. This device is currently preferred since it supports all of the required features, in particular a request to send function, as is discussed in greater detail hereinafter.

The shared memory is required since the communications controller is capable of acting as "master" and needs to share the RAM with the processor.

Typically, independent, or chained, buffers of data are stored in shared memory 11 and indexed, or referenced, by a series of rings. A simple protocol establishes whether the data buffers are controlled by either the processor 10 or the communications controller 12. If a packet of data is "owned" by the communications controller and requires sending, then the controller 12 will issue a request to send (RTS) to a Bus access controller FPGA 13. The controller 13 will then resolve access onto the bus with the other nodes wishing to transmit as per the MMSB arbitration protocol described above. If the node in question wins control of the bus it passes a clear to send (CTS) signal back to the communications controller, which then proceeds to transmit data as described above.

If a node is not transmitting data, or attempting to win control of the serial bus (i.e. not in the transmission cycle) then the node is automatically placed in the receive mode. In this mode the communications controller 12 filters the addresses of packets received and if any are intended for it, packets of data are automatically placed in pre-allocated (receive) buffers in the shared memory. Once again a simple protocol is used to pass ownership of a buffer to the processor which may then access and control the data.

The shared area of memory may be implemented as either a true dual-port memory or as a "pseudo" dual port RAM 11a, as indicated in FIG. 13. In the latter case, standard static RAM devices are used in a configuration of latches, buffers and control logic to allow access by both the processor and communications controller, but not at the same time. Since true DPRAM devices remain expensive, this pseudo DPRAM arrangement has a cost advantage in applications where multiple large buffer sizes (and hence larger memory devices) are required. However, this scheme adds complexity and can degrade performance. In designs requiring small buffer sizes and a high throughput of data, i.e. high serial rates, a true DPRAM is recommended.

In a typical application, the processor or co-processor is responsible for managing the data buffers and associated pointer information stored in the DPRAM. For example, in an EOSC application, data will be received via the MMSB serial interface and messages will either terminate at the EOSC or be reformatted and routed to a LAN controller, for example. The choice of control processor is application specific. In order to achieve a high throughput and a 16 Mbit/sec serial rate the preferred characteristics are currently non-multiplexed address/data bus, 16-bit data transfers, a maximum DPRAM access cycle time (including arbitration) of the order of 300 ns.

Figure 14A:
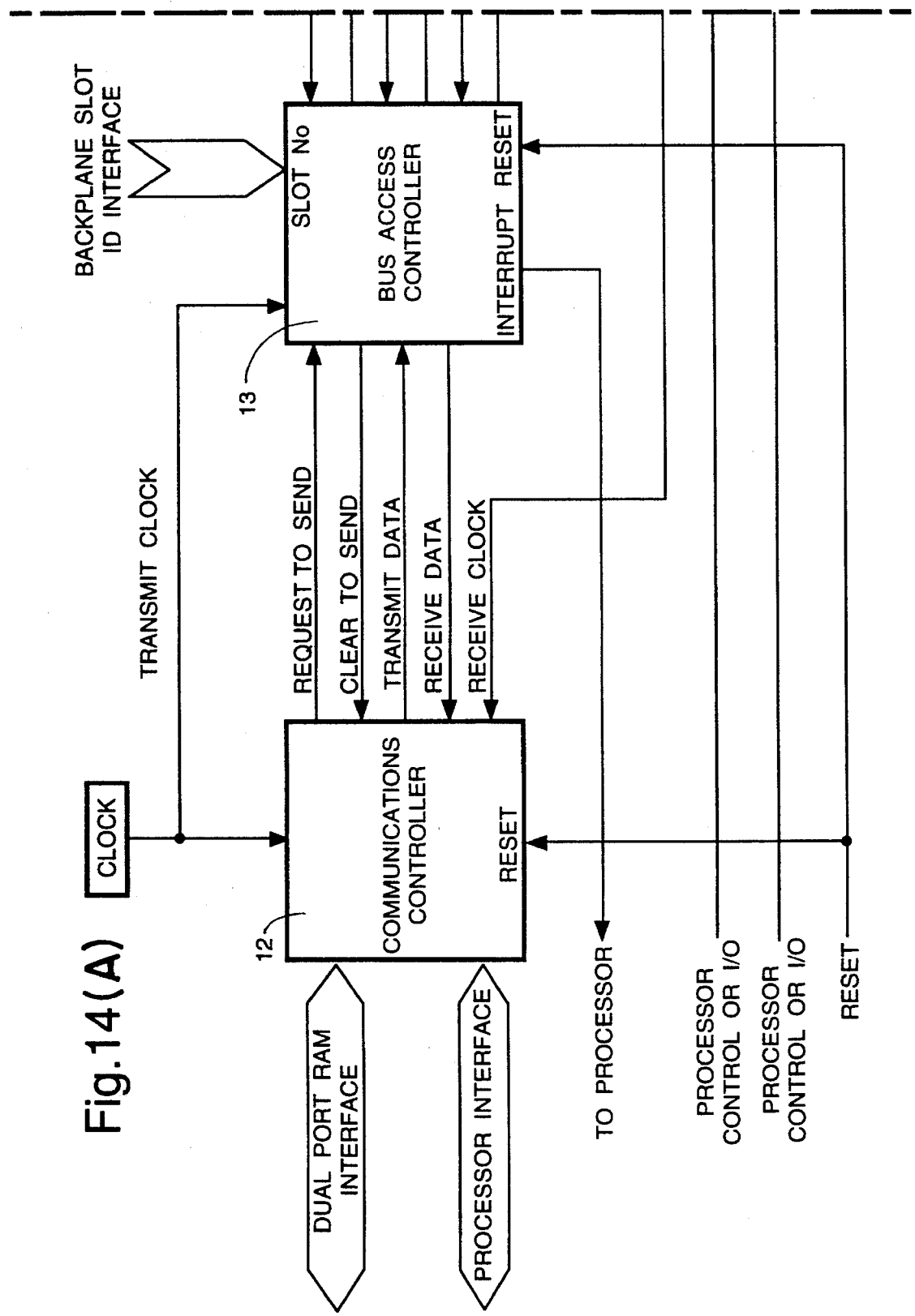
FIG. 14 illustrates part of the MMSB system of FIG. 13 in greater detail.
Figure 14B:
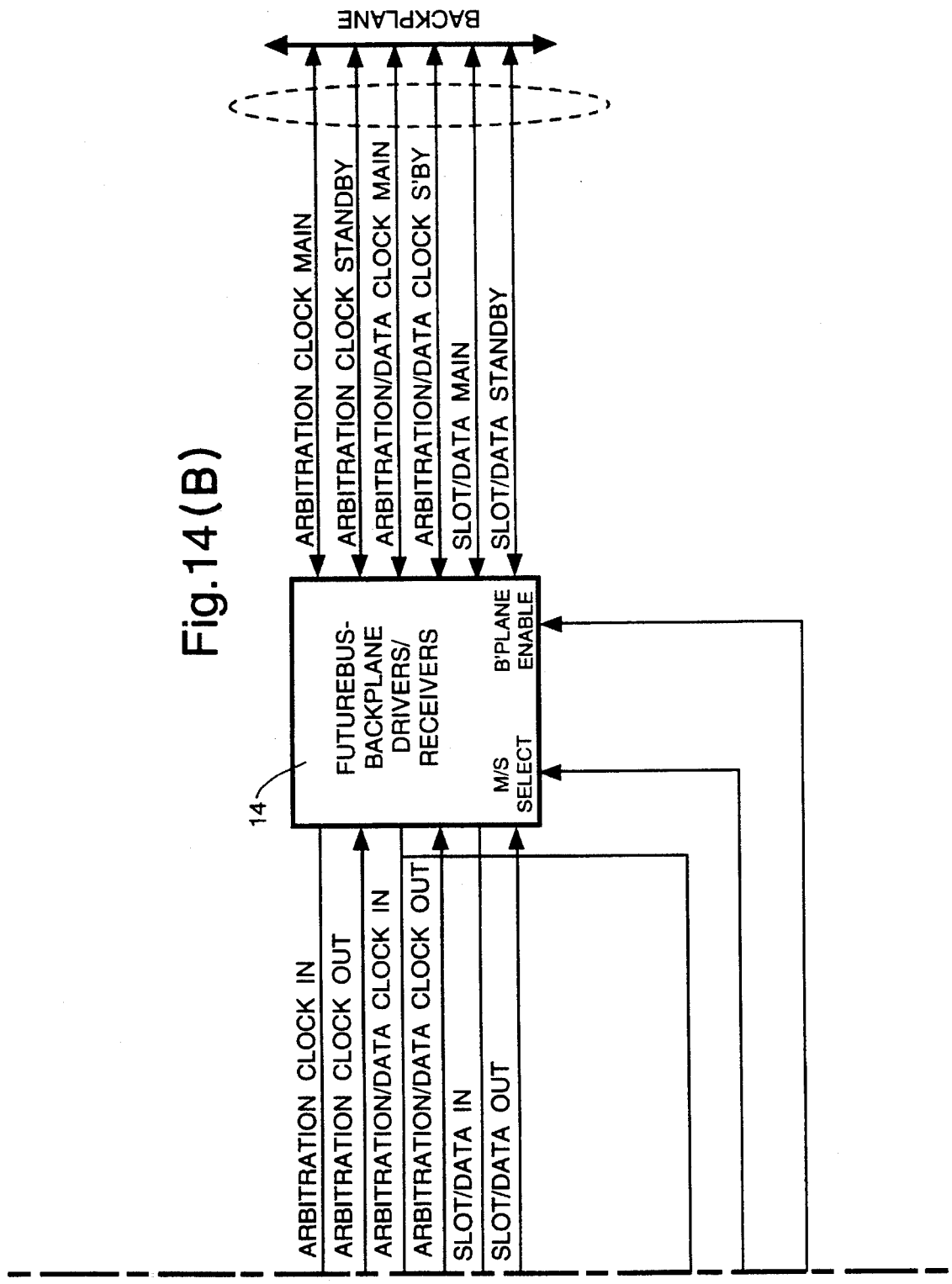

An enhanced MMSB system generic circuit is illustrated in FIG. 14. The shared memory and Processor interfaces are not shown in detail since they are application specific as described above. The function of the communications controller typically consists of a DMA (direct memory access) controller and a serial interface. The DMA controller is responsible for accessing the data buffers stored in the shared memory. The controller usually contains algorithms allowing the shared memory to be monitored for free buffers in the receive direction and a "look-ahead" facility to determine which buffers are ready to be transmitted in the transmit direction. In addition, features such as burst transfers to memory and the ability to interface to different types of processors are normally supported by such devices. The serial interface consists of a receive and transmit channel. Some available devices support dual transmit and receive channels. The receiver is responsible for recognising frame boundaries and checking incoming frame check sequences (FCS). Frames with incorrect FCS values are discarded. The receiver also converts the serial incoming data to parallel format and passes it to the DMA controller which stores received frames in the shared memory buffers. Certain available controllers also support advanced features to detect link idle and frame abort sequences. The transmitter is responsible for framing and serialising the data in the shared memory transmit buffers accessed by the DMA controller. The transmitter calculates the FCS of the outgoing data and appends it to the data. The additional flag sequences which may be generated for inter-frame fill are not required for this application. The transmitter is also responsible for control of the request to send and clear to send signals and it is these signals which are used to initiate the transmission cycle and control overall operation of the Bus Access Controller, see below. A number of high-speed communications controllers are available which support most of the features discussed but with a currently proposed Bus Access Controller 20 described hereinafter a communications controller supporting a RTS/CTS scheme is required, and as discussed above only the SGS-Thomson MK50H21 and Motorola MC68360 currently support these features.

The Bus Access Controller 13 is primarily responsible for controlling access onto the back plane serial bus. It is also responsible for resolving access priority with other nodes wishing to transmit and an activity monitoring feature is provided which allows changeover to a duplicate (slave) bus in the event of failure on the main bus. The Bus Access controller uses the RTS/CTS signals from the communications controller to operate a complete transmission cycle. In addition the Bus Access Controller interfaces to the back plane drivers/receivers 14 operating to the Futurebus+Standard and contains a direct interface to the back plane for determining the unique slot number required for the protocol to operate.

The Futurebus+Drivers in the transmit direction convert TTL level signals from the bus access controller 13 to back plane transceiver logic (BTL) levels on the back plane. Similarly in the receive direction BTL level signals are converted to TTL levels. The Futurebus+Standard is particularly applicable since its characteristics are ideally suited to applications requiring high-speed signals to be driven in a densely populated back plane. In addition in a carefully designed back plane, the BTL transceivers feature excellent noise immunity and a reduced voltage swing (1 volt on the bus) reduces power consumption. The drivers/receivers are arranged in two sets (two groups of three signals) in order to facilitate a protection switching scheme of a main and standby bus. Ideally a device should be shown which integrates sufficient BTL drivers/receivers to allow a main and standby bus to be implemented within a single device. One suitable device is a Philips FB2043 which integrates 7 BTL devices in a 3-3-1 arrangement.

Figure 17A:
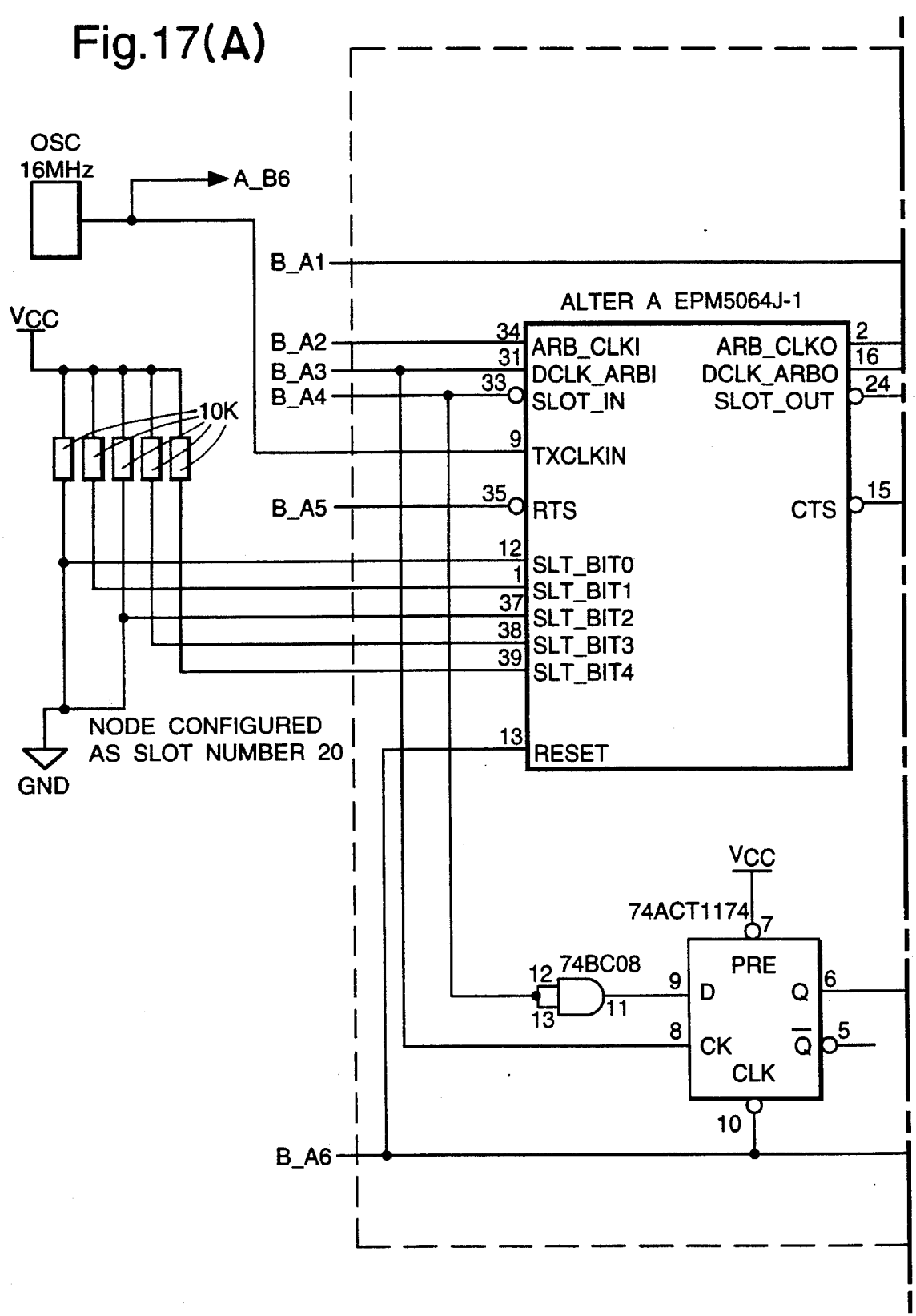
FIG. 17 illustrates part of a specific MMSB circuit (Bus Access Control and glue logic)
Figure 17B:
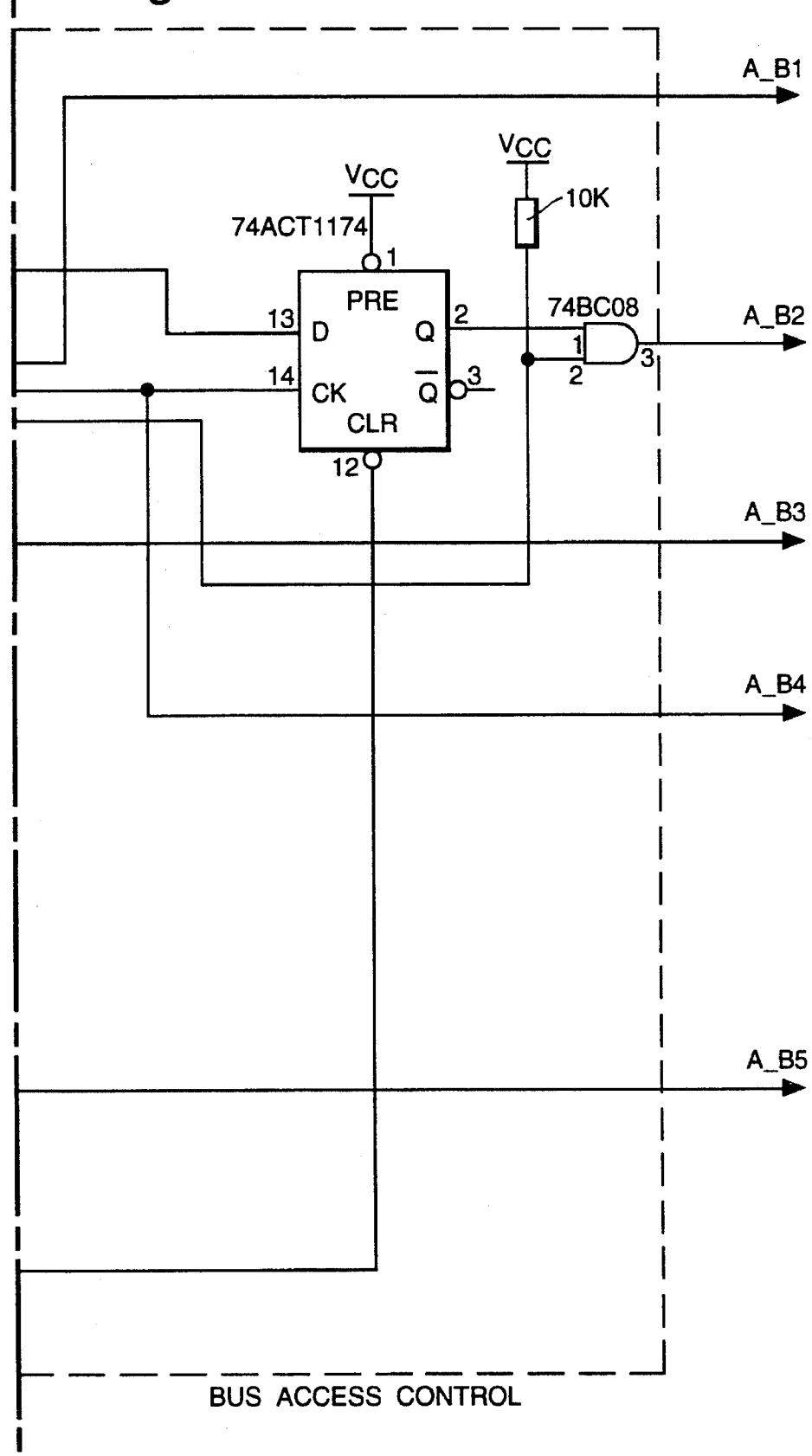

As discussed above, in order for the enhanced MMSB system to operate, each node must be given a unique slot value, a number in the range 0–31. This value is determined by the physical position of the node in the back plane and an interface is provided on the bus access controller FPGA 13 consisting of five signals. These should be hard-wired to GND or connected to VCC via pullup resistors (FIG. 17). Controller 13 monitors the arbitration clock on the main bus. If inactivity is detected on the clock signal for a period greater than 1 ms theft an interrupt is generated to the local processor. The processor may then attempt to establish communications with other nodes by forcing a changeover to the standby bus. This may be simply achieved by connecting the main/standby select signal on the drivers/receivers 14 to a parallel output port controllable by the processor.

The MMSB arbitration protocol is implemented in the Bus Access Controller 13, in particular this may be comprised by a Quicklogic QL8×12 FPGA (Field Programmable Gate Array) or ALTERA EPM5064-1 EPLD together with a small number of components external to the FPGA (referred to as glue logic) in order to satisfy the stringent timing requirements of the protocol. Of course an ASIC can be designed to provide all of the requirements in a single component, if required.

Figure 15:
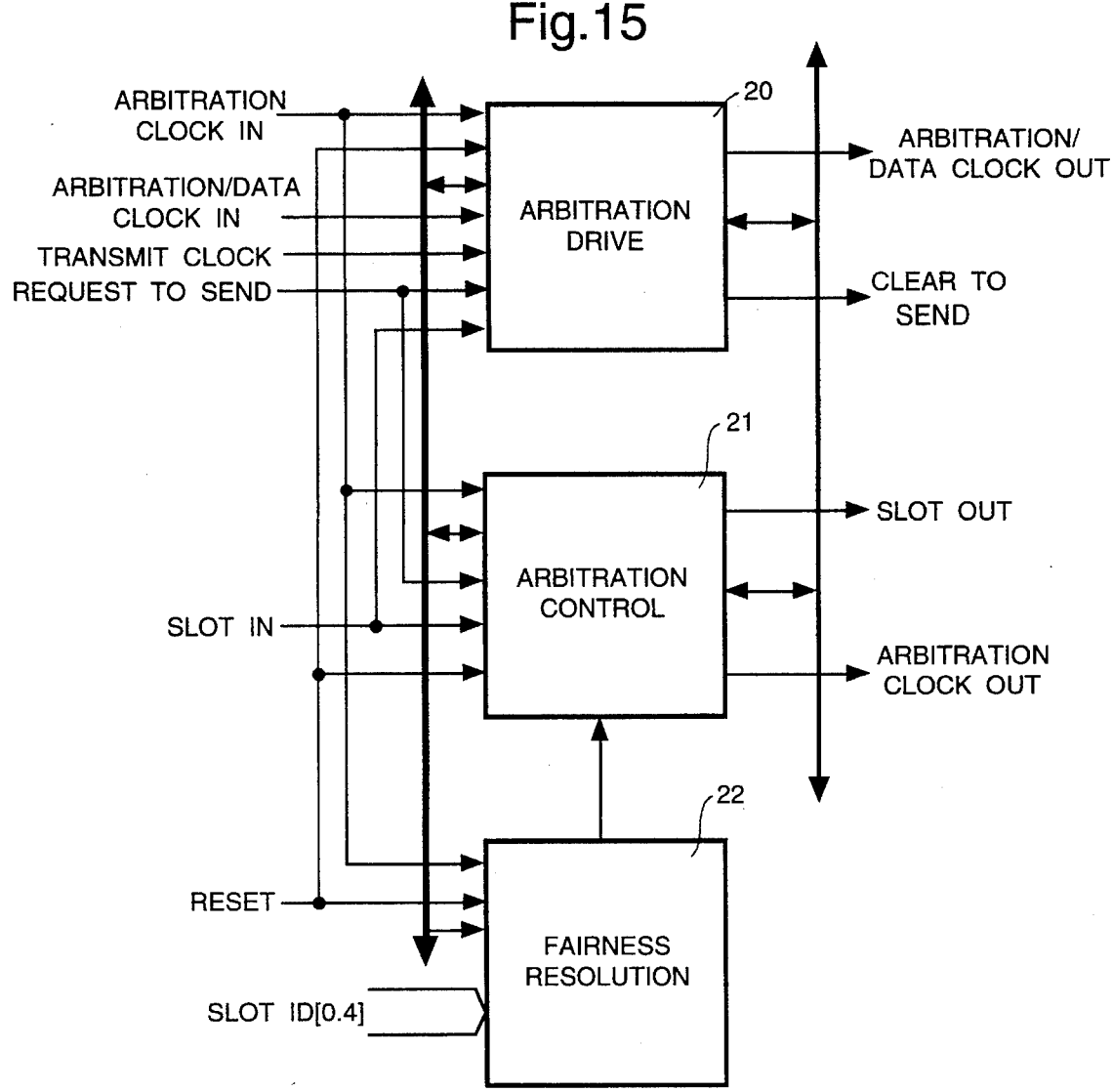
FIG. 15 illustrates a block diagram of the bus access controller.

An overview of the Bus Access Controller 13 is shown in FIG. 15. It consists of three major functional blocks, arbitration drive 20, arbitration control 21 and fairness resolution 22. The arbitration drive block 20 is responsible for detecting a bus idle condition and latching any request to send data from the communications controller. The logic drives the arbitration signal during an arbitration phase. If a node wins the arbitration phase, the transmit clock is enabled onto the arbitration/data clock line for the transmission phase. In addition, this block generates the CTS signal which allows the communications controller to begin transmitting data. The arbitration control block 21 is responsible for generating the slot signal which indicates the end of an arbitration phase. If a node wins the arbitration phase, the logic "grounds" the arbitration clock until a transmission phase is complete. The fairness resolution block 22 is mainly responsible for counting slot periods from the SLOT ID value given by the physical backplane position of the node. In addition, the logic is responsible for the promotion and relegation of nodes from the first and second groups.

Figure 16A:
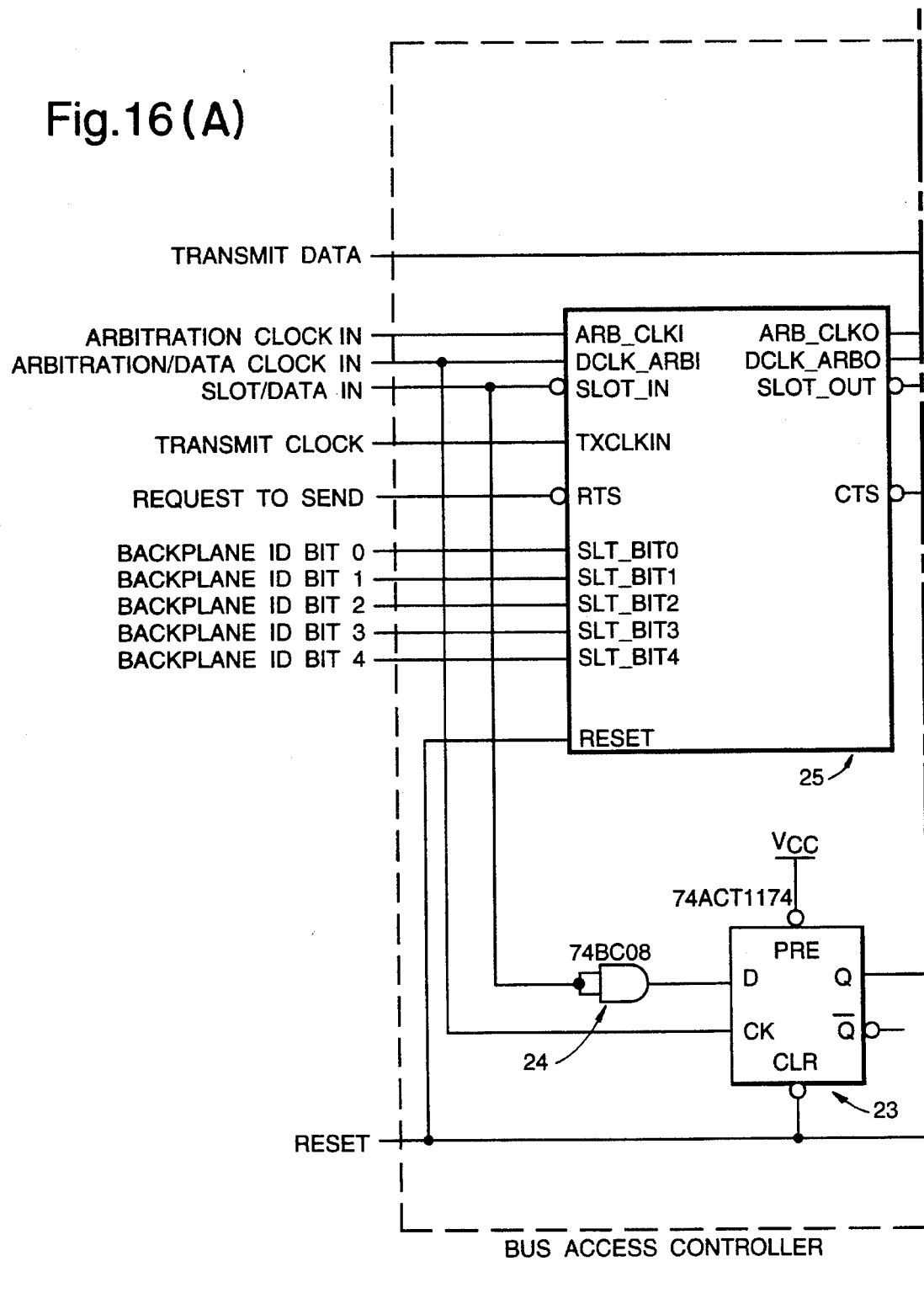
FIG. 16 illustrates a Bus Access Controller FPGA and associated glue logic.
Figure 16B:
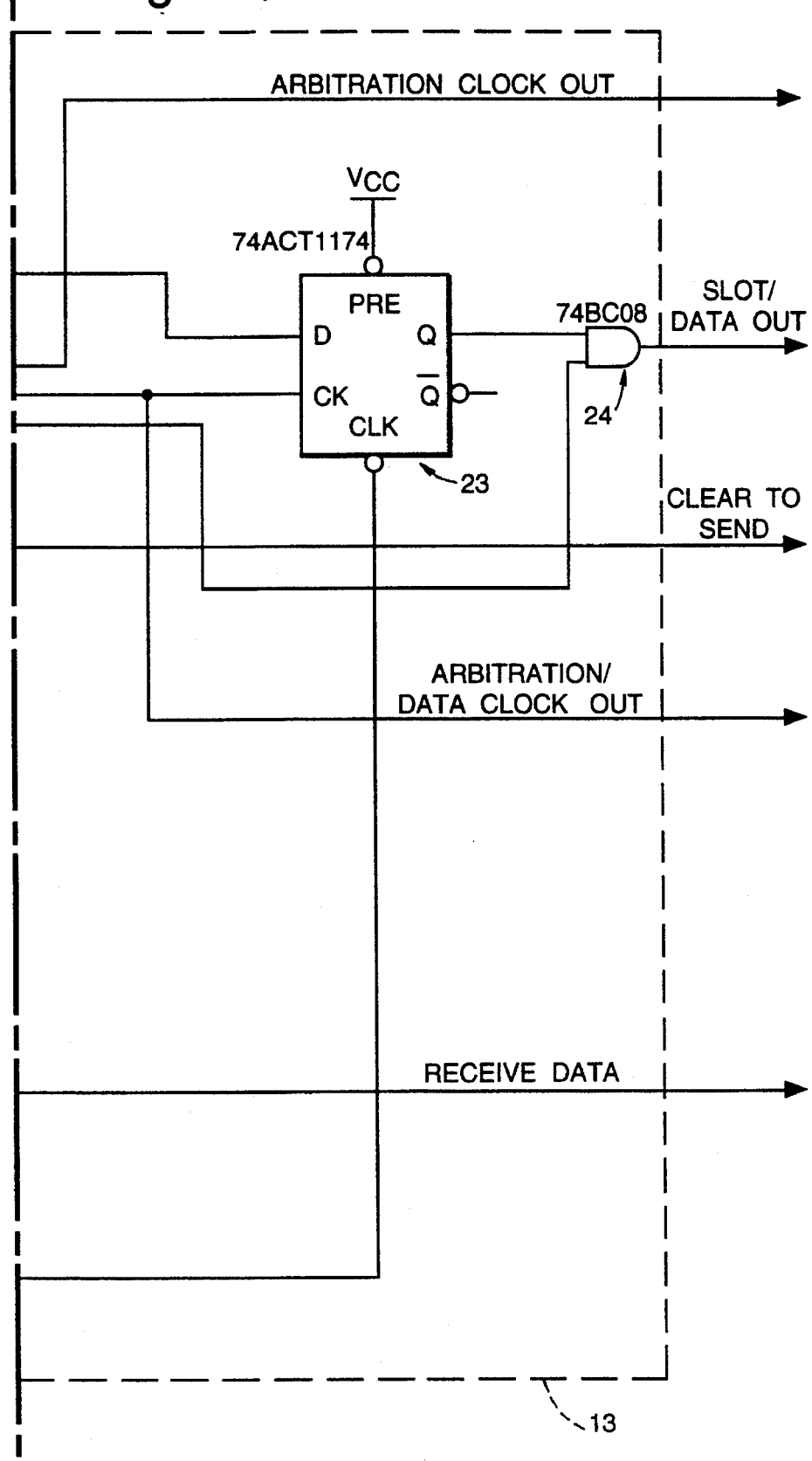

As discussed above a small amount of glue logic is required in addition to the Quicklogic QL8×12 FPGA to provide the overall Bus Access Controller 13. In the arrangement illustrated in FIG. 16 the glue logic consists of an additional two D-type latches 23, such as TEXAS 74ACT1174, and two TOSHIBA 74BC08 or equivalent AND gates 24, in combination with the FPGA 25 to provide the overall Bus Access Controller 13.

This design of Bus Access Controller 13 will only support communications controllers which feature both request to send (RTS) and clear to send (CTS) signals, because some indication is needed of when the communications controller requires access to the serial bus. The majority of advanced controllers currently available appear to support only a clear to send input, and in order to support such devices it may be necessary for the Bus Access logic to trap the leading flag condition of any transmission and temporarily halt transmission of the data until bus access has been resolved. Hence the SGS-Thomson device referred to above is currently preferred. Furthermore it should be noted that the described Bus Access Controller 13 requires any communications controller to be programmed so that consecutive frames are separated by a minimum of 2 flags i.e. interframe fill is 2 flags minimum. This is due to the transition period required between the end of a transmission phase and the following idle period.

Figure 18A:
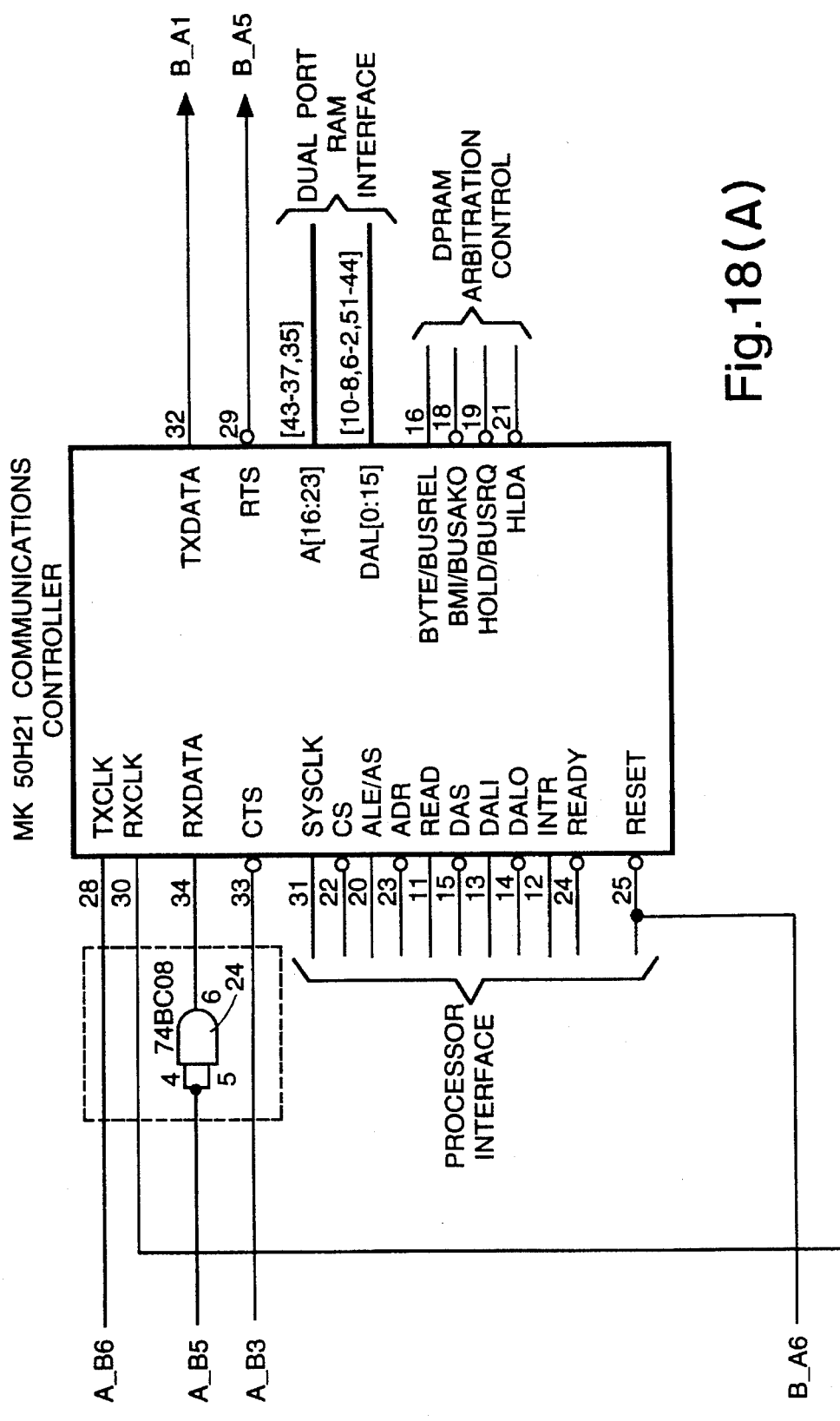
FIG. 18 illustrates another part of the specific MMSB system circuit (Communications Controller and Futurebus+ transceivers)

An example of the specific MMSB circuitry that the above results in is shown in FIGS. 17 and 18. The circuitry does not include details of the processor or shared memory interface, since this is dependent on the type of shared memory required and the type of RAM arbitration scheme implemented. FIG. 18 includes an additional 74BC08 AND gate 24 (indicated in a dotted box) connected to the RXDATA input of the communications controller. This is required to guarantee the 2nS data hold time specified by the MK50H21 controller.

Figure 19:
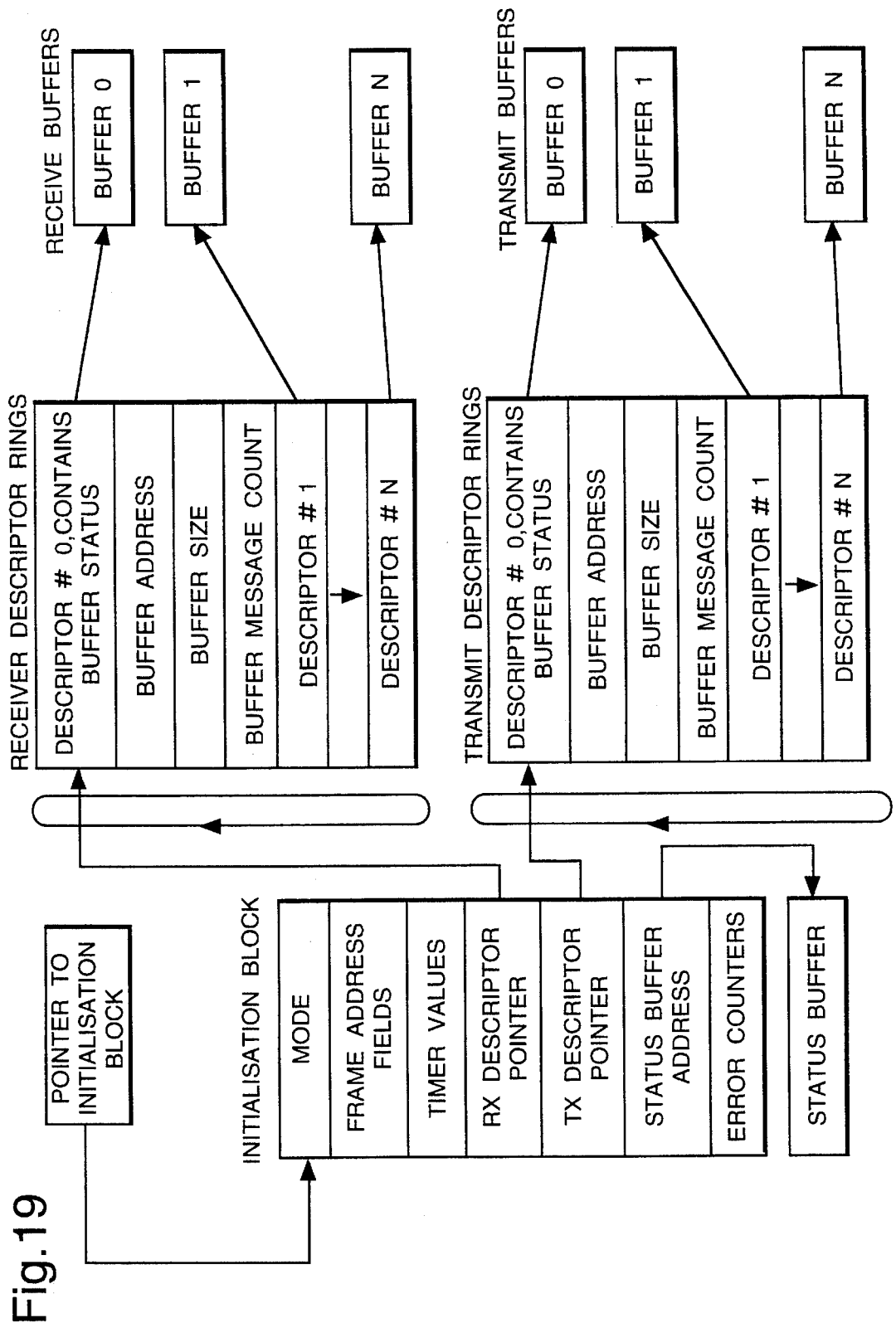
FIG. 19 illustrates communications controller buffer management organisation.

Buffer management of the MK50H21 controller will now be briefly described with reference to FIG. 19. The basic organisation of the buffer management is a circular queue of tasks in memory called descriptor rings. There are separate rings to describe the transmit and receive operations and up to 128 buffers may be queued up on a descriptor ring awaiting execution by the communications controller. The descriptor ring has a descriptor assigned to each buffer. Each descriptor holds a pointer for the starting address of that buffer and holds a value for the length of the buffer in bytes. Each descriptor also contains a control bit which denotes whether the processor or the communications controller "owns" the buffer. For transmit, when the communications controller owns the buffer, it is allowed and commanded to transmit the buffer. For receive, when the communications controller owns the buffer, it may place received data in that buffer. The buffer management mechanism will handle frames longer than the length of an individual buffer. This is done by a chaining method which utilises multiple buffers. The communications controller tests the next descriptor ring in a "look-ahead" manner. If the frame is too long for one buffer, the next buffer will be used after filling the first buffer i.e.. "chained". The communications controller will then look ahead to the next buffer and chain that buffer if required.

We claim:

1. A multi-master serial bus system comprising a plurality of nodes, a communications highway over which transmission of data between the nodes can be effected, and access control means enabling only one node to access the highway at a time, wherein transmission of data from one node to another comprises an arbitration phase and a transmission phase, wherein the arbitration phase is divided into a plurality of slots, each node having an associated slot number, wherein there are n nodes and the arbitration phase is divided into 2n slots, which slots are divided into two groups of n slots, each node having a said associated slot number but which group it is in being determined by an arbitration scheme providing fairness of access of the nodes to the highway, wherein the highway comprises first, second and third lines, wherein the first line carries an arbitration clock signal during the arbitration phase, wherein the second line carries an arbitration signal during the arbitration phase and a data clock signal during the transmission phase, and the third line carries a slot signal during the arbitration phase and, when one said node has won access to the highway, carries the actual data to be transmitted from said node during the transmission phase.

2. A bus system as claimed in claim 1, wherein the three lines are duplicated for protection purposes.

3. A bus system as claimed in claim 2, wherein data is transmitted over the highway in the form of HDLC (high-level data link control) type messages.

4. A bus system as claimed in claim 3, wherein at each said node there is a said access control means comprising a processing resource of the node, a communications controller, a memory shared between the processing resource and the communications controller, data to be transmitted onto the highway being stored in the memory by the processing resource and received data from the highway being stored in the memory by the communications controller, a bus access controller, connected to the communications controller, for controlling access onto the highway and resolving access priority with other nodes in an arbitration scheme, and highway and connected to the bus access controller drivers/receivers directly interfaced to the highway.

5. A bus system as claimed in claim 1, wherein the nodes are initially associated with the first group of n slots, wherein when a said node associated with the first group of slots wins the arbitration phase it adds n to its slot position and becomes associated with the second group of slots, wherein when a said node associated with the second group of slots wins the arbitration phase it remains associated with the second group of slots, and wherein when a said node is associated with the second group of slots and the first n slots of the arbitration phase pass without a winner then the said node subtracts n from its position and becomes re-associated with the first group of slots.

6. A bus system as claimed in claim 1, and wherein when one said node has won access to the highway, that one said node originates both the data clock signal for the transmission phase and the actual data to be transmitted and the speed of transmission is independent of the length of the highway.

\* \* \* \* \*